(12) United States Patent
Wikblom et al.

(10) Patent No.: US 12,741,694 B2
(45) **Date of Patent: *Sep. 22, 2026**

(54) VEHICLE COMPRISING A COLLISION PROTECTION STRUCTURE

(71) Applicant: Volvo Truck Corporation, Gothenburg (SE)

(72) Inventors: Erik Wikblom, Gothenburg (SE); Gunnar Björkman, Gothenburg (SE); Fredrik Fors, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 265 days.

This patent is subject to a terminal disclaimer.

(21) Appl. No.: 18/588,386

(22) Filed: Feb. 27, 2024

(65) Prior Publication Data

US 2024/0199124 A1 Jun. 20, 2024

Related U.S. Application Data

(63) Continuation of application No. 17/911,697, filed as application No. PCT/EP2020/057983 on Mar. 23, 2020, now Pat. No. 11,958,531.

(51) Int. Cl.
*B62D 21/15* (2006.01)
*B62D 21/02* (2006.01)
*B62D 21/11* (2006.01)

(52) U.S. Cl.
CPC .......... *B62D 21/155* (2013.01); *B62D 21/02* (2013.01); *B62D 21/11* (2013.01)

(58) Field of Classification Search
CPC .... B62D 21/155; B62D 21/15; B62D 21/152; B62D 21/02; B62D 21/11
See application file for complete search history.

(56) References Cited

U.S. PATENT DOCUMENTS 6,109,654 A 8/2000 Yamamoto et al.
6,938,948 B1 9/2005 Cornell et al.
(Continued)

FOREIGN PATENT DOCUMENTS

CN 202608884 U 12/2012
CN 104220304 A 12/2014
(Continued)

OTHER PUBLICATIONS

Extended European Search Report for European Patent Application No. 23213179.7, mailed Mar. 15, 2024, 6 pages.
(Continued)

*Primary Examiner* — James A English
(74) *Attorney, Agent, or Firm* — Withrow & Terranova, PLLC

(57) ABSTRACT

A vehicle, comprising a chassis extending between the rear end and the front end of the vehicle, the chassis comprising two frame members having their main directions of extension along the longitudinal direction and being located on a respective side of a longitudinal geometrical centre axis of the chassis. Resilient elements, such as bushings, are provided on the chassis. A collision protection structure is located between the two frame members and is configured to absorb energy by becoming deformed when the chassis is subjected to a rearwardly directed impact force which is greater than a threshold force, wherein the collision protection structure is suspended from the chassis by the resilient elements so as to act as a mass damper under normal operating conditions.

12 Claims, 7 Drawing Sheets

(56) References Cited

U.S. PATENT DOCUMENTS

| | | | |
|---|---|---|---|
| 8,801,080 B2 | 8/2014 | Uhlenbruch et al. | |
| 11,958,531 B2 | 4/2024 | Wikblom et al. | |
| 2006/0214414 A1 | 9/2006 | Wehner et al. | |
| 2008/0238150 A1 | 10/2008 | Nakamura et al. | |
| 2011/0198832 A1 | 8/2011 | Takeshita et al. | |
| 2014/0374176 A1 | 12/2014 | Merkel et al. | |
| 2015/0360548 A1 | 12/2015 | Merkel | |
| 2019/0016388 A1 | 1/2019 | Shimizu | |
| 2019/0322164 A1* | 10/2019 | Sasaki .................. | B62D 21/155 |
| 2019/0375460 A1 | 12/2019 | Alwan et al. | |

FOREIGN PATENT DOCUMENTS

| | | |
|---|---|---|
| CN | 109906159 A | 6/2019 |
| CN | 110497871 A | 11/2019 |
| DE | 102009015155 A1 | 9/2010 |
| FR | 2931782 A1 | 12/2009 |
| JP | 2000177627 A | 6/2000 |
| JP | 2007168484 A * | 7/2007 |
| JP | 2019025945 A | 2/2019 |

OTHER PUBLICATIONS

Notice of Allowance for U.S. Appl. No. 17/911,697, mailed Jan. 17, 2024, 9 pages.
Notification to Grant for Chinese Patent Application No. 202080098565.1, mailed Nov. 27, 2023, 7 pages.
Intention to Grant for European Patent Application No. 20713613.6, mailed Oct. 17, 2023, 32 pages.
International Search Report and Written Opinion for International Patent Application No. PCT/EP2020/057983, mailed Jan. 19, 2021, 14 pages.
International Preliminary Report on Patentability for International Patent Application No. PCT/EP2020/057983, mailed Apr. 7, 2021, 12 pages.
Examination Report for European Patent Application No. 23213179.7, mailed Apr. 13, 2026, 4 pages.

* cited by examiner 1
2
4
6
8
10

34
62
32
60
60
20
64

VEHICLE COMPRISING A COLLISION PROTECTION STRUCTURE

PRIORITY APPLICATIONS

The present application is a continuation of U.S. patent application Ser. No. 17/911,697, filed on Sep. 15, 2022 and issued as U.S. Pat. No. 11,958,531, which is a 35 U.S.C. § 371 national phase filing of International Application No. PCT/EP2020/057983, filed Mar. 23, 2020, the disclosures of which are incorporated herein by reference in their entireties. Priority is claimed to each of the aforementioned applications.

TECHNICAL FIELD

The invention relates to a vehicle. In particular, it relates to a vehicle comprising a collision protection structure.

The invention can be applied in heavy-duty vehicles, such as trucks, buses and construction equipment. Although the invention will mainly be described with respect to a truck, the invention is not restricted to this particular vehicle, but may also be used in other vehicles such as passenger cars.

BACKGROUND

In the vehicle industry, much effort is put in the development of electrically driven heavy-duty vehicles. It is desirable to used substantially the same platform for assembling an electrically driven vehicle as for a corresponding vehicle propelled by an internal combustion engine. For instance, an electric truck built on the same platform as a truck of the type having an internal combustion engine underneath the cab, will normally have the frame rails provided with battery packs, while the space underneath the cab may be utilized for other components where the internal combustion engine would have been located. However, for such electric trucks, the battery packs will add mass behind the cab on the frame sides and higher stiffness. These two points combined means that, in case of a frontal collision, the energy has to be absorbed in the frontal area of the truck. The frame sides do not give enough absorption to reduce the cab intrusion to an acceptable level. This may result in a safety problem for the driver.

Furthermore, since an internal combustion engine will normally act as a mass damper, when removing the engine there is nothing there to counter-balance the unbalances from the tires and road. This may result in less comfort for the driver.

SUMMARY

An object of the invention is to provide a vehicle which mitigates the drawbacks mentioned above.

The object is achieved by a vehicle according to claim 1. Thus, the present disclosure provides a vehicle, comprising:

a rear end, a front end located forwardly of the rear end, wherein a direction extending from the rear end towards the front end or vice versa is defined as a longitudinal direction of the vehicle, a chassis extending between the rear end and the front end, the chassis comprising two frame members having their main directions of extension along the longitudinal direction and being located on a respective side of a longitudinal geometrical centre axis of the chassis, resilient elements, such as bushings, provided on the chassis, and a collision protection structure located between said two frame members and configured to absorb energy by becoming deformed when the chassis is subjected to a rearwardly directed impact force which is greater than a threshold force, wherein the collision protection structure is suspended from the chassis by said resilient elements so as to act as a mass damper under normal operating conditions.

The inventive concept is based on the insight that an additional structure may be provided not only to absorb energy for reducing cab intrusion, but also for functioning as a mass damper if suspended from resilient elements (such as the resilient elements form which an internal combustion engine would have been suspended). Thus, a synergetic effect is achieved by the vehicle of this disclosure, in particular because of the suspension of the collision protection structure, as stated above.

According to at least one exemplary embodiment, the vehicle is an electric vehicle, such as an electric truck, propelled by electric energy stored in a battery. However, it should be understood that the general inventive concept may be implemented for other types of vehicles as well, such as hydrogen gas powered vehicles, etc.

According to at least one exemplary embodiment, the vehicle comprises a cab, wherein the collision protection structure is located underneath the cab. This is advantageous, since it provides a mass damping function, improving the driver comfort for a driver sitting in the cab when the vehicle is driven under normal operating conditions, i.e. not in a collision.

According to at least one exemplary embodiment, the chassis comprises a rear cross member located rearwardly of the collision protection structure and interconnecting the two frame members of the chassis, wherein when the chassis is subjected to said rearwardly directed impact force which is greater than a threshold force, then said rear cross member acts as an abutment and counteracts or retards a rearward movement of the collision protection structure. This is advantageous since the abutting function of the rear member will result in absorption of at least some, or most, of the kinetic energy of the collision protection structure by deformation thereof.

According to at least one exemplary embodiment, the chassis comprises a front cross member located forwardly of the collision protection structure and interconnecting the two frame members of the chassis, wherein when the chassis is subjected to said rearwardly directed impact force which is greater than a threshold force, then said front cross member is configured to press the collision protection structure rearwards. This may suitably be due to the two frame members of the chassis buckling upon a collision, wherein the buckling causes the front cross member to move rearwardly and thereby pressing the collision protection structure rearwardly. Thus, some of the kinetic energy resulting from the collision will be transferred to the collision protection structure.

According to at least one exemplary embodiment, the collision protection structure is configured to be deformed between the front cross member and the rear cross member when the chassis is subjected to said rearwardly directed impact force which is greater than a threshold force. Thus, the front cross member may transfer some of the kinetic energy resulting from a collision to the collision protection structure, which will then be absorbed when the collision protection structure is pressed against the rear cross member, which thus together with the front cross member deformed the collision protection structure.

According to at least one exemplary embodiment, when said two frame members of the chassis deform in reaction to a collision of the vehicle, the collision protection structure is configured to limit and/or counteract further deformation of said two frame members. In particular, if the collision protection structure is placed between the front cross member and the rear cross member, then the added structural strength provided by the collision protection structure may counteract the buckling of the two frames of the chassis. At relatively low loads, the collision protection structure may remain substantially undeformed. In particular, at relatively low loads the collision protection structure may be stiff enough and have sufficient structural strength to hold against the front cross member and rear cross member, preventing the front cross member to move further rearwards, and thus counteracting progression of the chassis frames buckling. This also reduces the risk of cab intrusion.

According to at least one exemplary embodiment, the collision protection structure comprises a subframe suspended between the two frame members of the chassis. The subframe may suitably have the form of an open cage. For instance, the subframe may have a lower cage side and lateral cage sides. Suitably, the cage is open from above, enabling components/sub-modules to be lowered into the cage shape. Thus, the subframe may provide a simple and time-efficient mounting of components/sub-modules to the subframe. Furthermore, as will be discussed in more detail below, in at least some exemplary embodiments there are connection elements connected to the subframe for mounting the collision protection structure to said resilient elements. Thus, once the components/sub-modules have been received by the subframe, the entire collision protection structure with its cargo can be mounted to the chassis by connecting the connecting elements to said resilient elements.

According to at least one exemplary embodiment, the subframe comprises two longitudinal subframe portions extending generally in the longitudinal direction of the vehicle and being located on a respective side of a central vertical plane containing said longitudinal geometrical centre axis, wherein when the chassis is subjected to said rearwardly directed impact force which is greater than a threshold force, then each one of said longitudinal subframe portions is configured to split up the energy reaching the longitudinal subframe portion as a result of said impact force, along at least two longitudinal load paths formed by two sections of the longitudinal subframe portion. This is advantageous since the rearwardly directed energy is not focussed to one path, but instead each load path will have a reduced rearwardly directed energy. Each longitudinal subframe portion may suitably form a lateral cage side, or form part of a lateral cage side, at least in embodiments in which the subframe has a cage-like configuration. The two sections forming the two load paths of each longitudinal subframe portion, may suitably be vertically separated to form such lateral cage sides.

This is reflected in at least one exemplary embodiment, according to which, for each longitudinal subframe portion, the two sections that form the longitudinal load paths are vertically separated, forming an upper section and a lower section. Thus, this contributes to the robustness and load distribution capability of the collision protection structure.

According to at least one exemplary embodiment, the subframe comprises one or more cross beams interconnecting said longitudinal subframe portions with each other, thereby providing a shortened unsupported length of the longitudinal subframe portions, wherein said one or more cross beams support, for each longitudinal subframe portion, at least one of said sections forming the longitudinal load paths. For instance, in some exemplary embodiments, the one or more cross beams may extend between the lower sections forming the longitudinal load paths. In some exemplary embodiments, the one or more cross beams may extend between the upper sections forming the longitudinal load paths. In some exemplary embodiments, the one or more cross beams may extend between both the lower and the upper sections forming the longitudinal load paths.

In at least some exemplary embodiments in which the subframe has a cage-like configuration, one or more of said cross beams may suitably form a bottom cage side. In some exemplary embodiments, such cross beams forming a bottom cage side may be configured to receive sub-modules, such as sub-modules of a traction battery propulsion system. In some exemplary embodiments, sub-modules may comprise one or more of battery components (such as high voltage or traction voltage components), cooling pumps, steering pump, climate module, and air compressor.

Thus, in a general sense, according to at least one exemplary embodiment, the collision protection structure is configured to form a platform or support for carrying at least one vehicle sub-module, such as battery components (such as high voltage or traction voltage components), cooling pumps, steering pump, climate module and air compressor.

According to at least one exemplary embodiment, for each longitudinal subframe portion, the sections forming the longitudinal load paths are less stiff (softer) relative to at least one of a forwardly and a rearwardly adjacent section of the subframe portion. By having sections with different properties, the energy is managed in an efficient way and the behaviour of the collision protection structure may be controlled and predicted. It should be noted that in other exemplary embodiments, for each longitudinal subframe portion, the sections forming the longitudinal load paths may instead be stiffer than at least one of said forwardly and said rearwardly adjacent section of the subframe portion. Other sequences of soft and stiff sections are also conceivable.

According to at least one exemplary embodiment, the collision protection structure is a frontal collision protection structure. Thus, the collision protection structure is particularly advantageous for handling frontal collisions.

According to at least one exemplary embodiment, the number of said resilient elements is at least three, wherein the collision protection structure comprises at least one rear connection element at a rear end area of the collision protection structure for connecting to at least one of said resilient elements, and at least one front connection element at a front end area of the collision protection structure for connecting to at least another one of said resilient elements. Advantageously, the same resilient elements and the same locations of the resilient elements may be used as would otherwise have been used for mounting an internal combustion engine. For instance, rubber bushings which would normally be used for mounting an internal combustion engine may now instead be used for suspending the collision protection structure.

It should also be understood that front and rear bushings, to which the front and rear connection elements are configured to be connected, may be existing standard bushings on a vehicle or may be separate bushings applied to the vehicle.

According to at least one exemplary embodiment, each one of said two frame members of the chassis carries at least one of said resilient elements. Suitably, each of the two frame members carries at least one rear resilient element for receiving rear connection elements of the collision protection structure. There rear resilient elements may suitably be or correspond to existing standard resilient elements (such as rubber bushings). The rear resilient elements may suitable be provided on a centrally facing surface of the respective frame members.

According to at least one exemplary embodiment, the front cross member carries at least one of said resilient elements, which is in the form of a front resilient element, for receiving the front connection element of the collision protection structure. Suitably the front cross member carries two or more resilient elements, such as rubber bushings, for receiving mating front connection elements of the collision protection structure.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
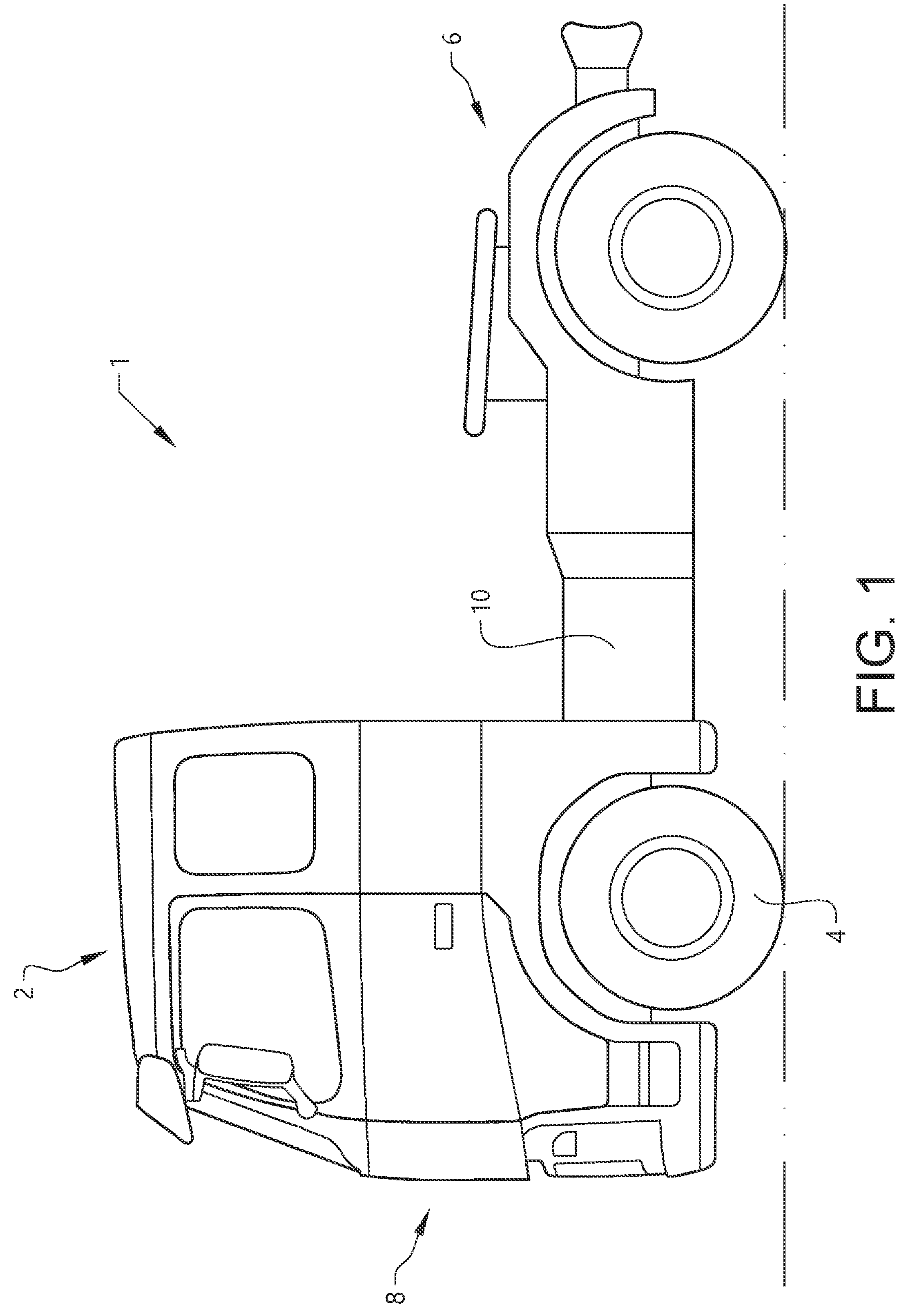
FIG. 1 illustrates a vehicle, in accordance with at least one exemplary embodiment of the invention.

FIG. 1 illustrates a vehicle 1, in accordance with at least one exemplary embodiment of the invention. Although the vehicle 1 is illustrated in the form of a truck, other types of vehicles, such as busses, construction equipment, trailers or passenger cars may be provided in accordance with the invention.

The truck (vehicle) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more.

The vehicle 1 comprises a rear end 6, a front end 8 located forwardly of the rear end 6, wherein a direction extending from the rear end 6 towards the front end 8 or vice versa is defined as a longitudinal direction of the vehicle. A chassis 10 extends between the rear end 6 and the front end 8, and a collision protection structure (not shown) is suspended from the chassis 10, as will be described in more detail in connection with FIG. 2.

Figure 2:
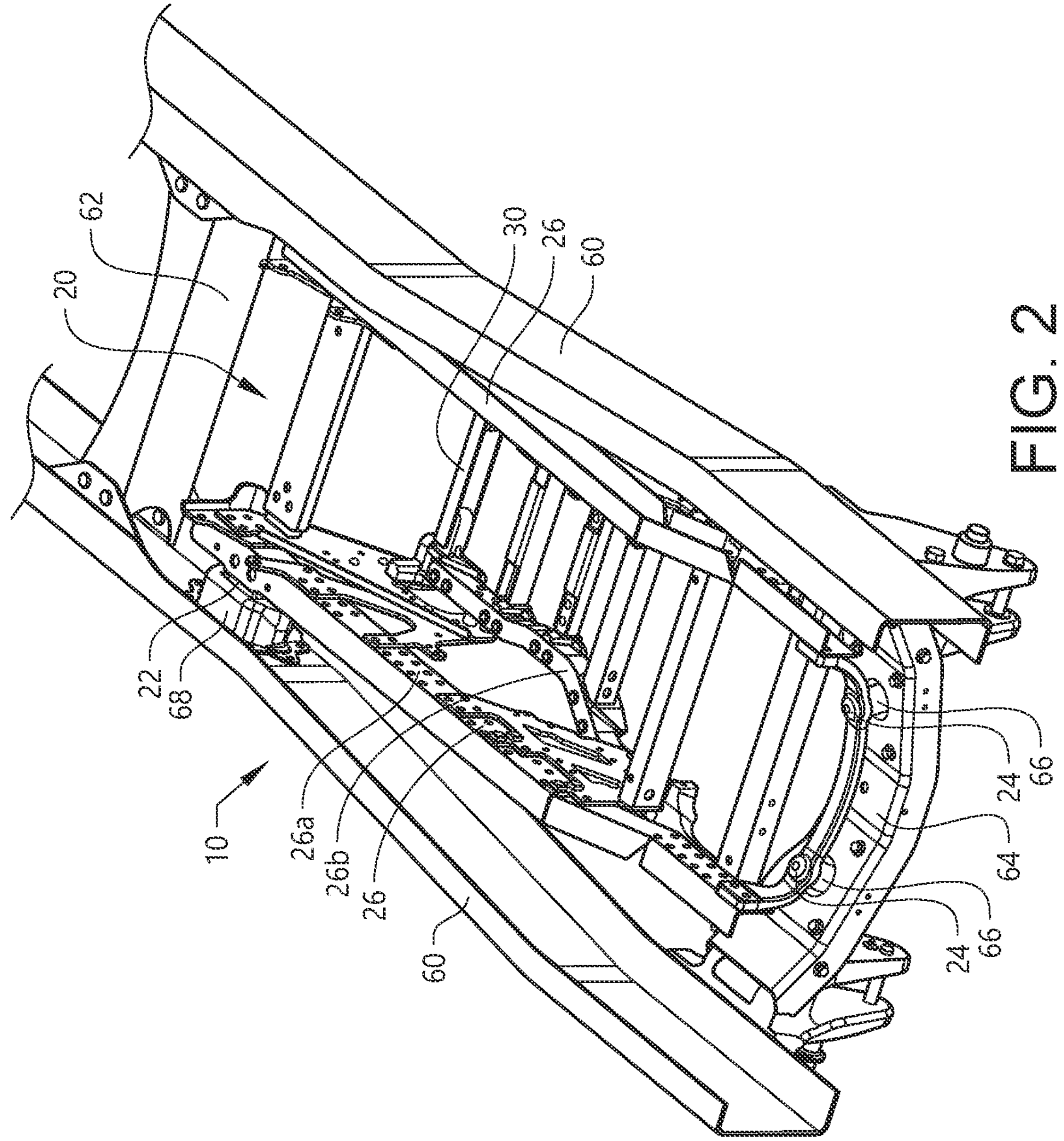
FIG. 2 is a perspective view of a collision protection structure, in accordance with at least one exemplary embodiment, which may be provided in the vehicle illustrated in FIG. 1.

FIG. 2 is a perspective view of a collision protection structure 20, in accordance with at least one exemplary embodiment, which may be provided in the vehicle 1 illustrated in FIG. 1. Suitably, the collision protection structure 20 is located underneath the cab 2, at a location corresponding to where an internal combustion engine would have been located under the cab 2.

Figure 4:
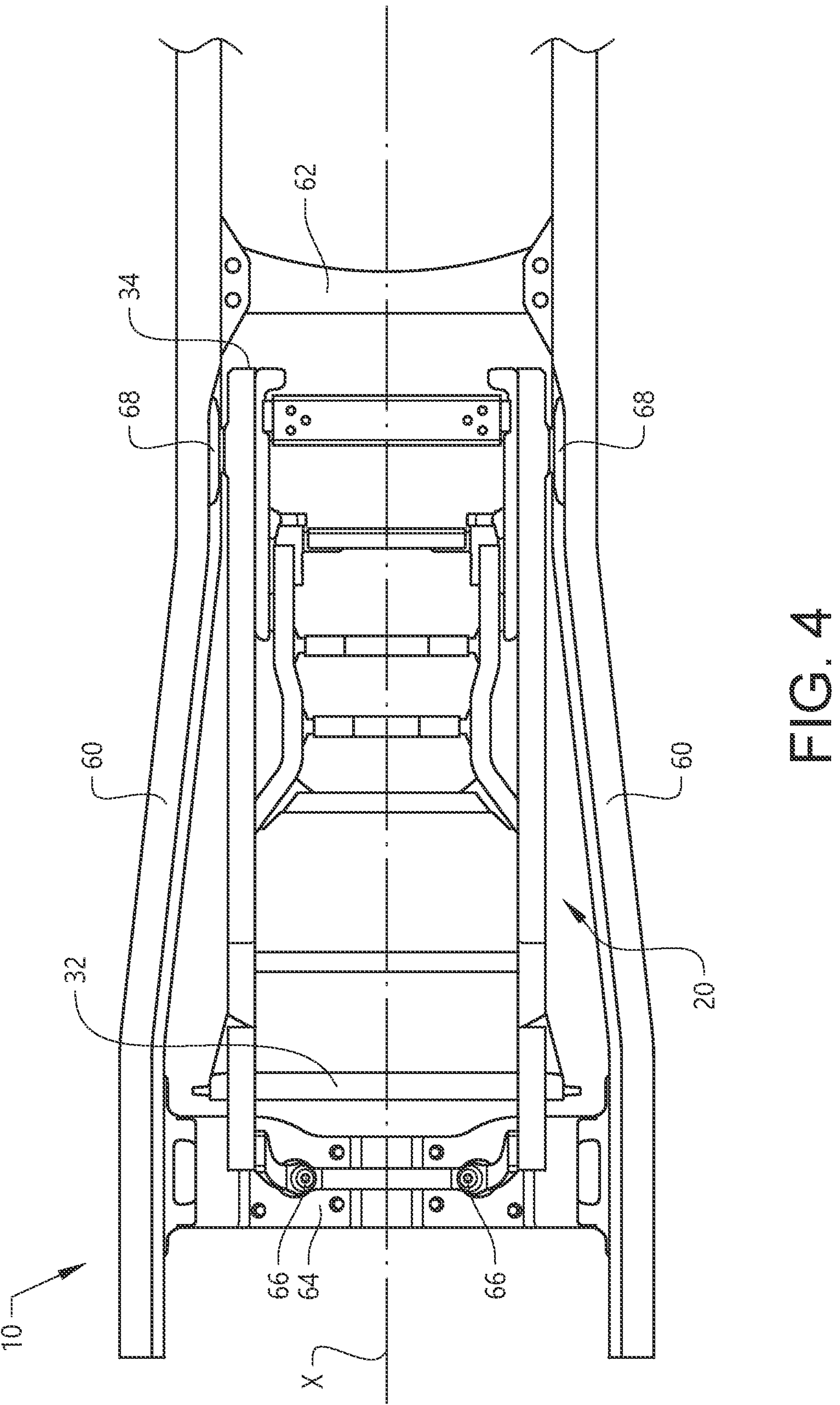
FIG. 4 is a top view of the collision protection structure.

As shown in FIG. 2, the chassis 10 comprises two frame members 60 having their main directions of extension along the longitudinal direction of the vehicle and being located on a respective side of a longitudinal geometrical centre axis x of the chassis (the geometrical centre axis is indicated in FIG. 4). The frame members 60 may also be referred to as frame rails.

Continuing with FIG. 2, the chassis 10 comprises a rear cross member 62 interconnecting the two frame members 60. The chassis 10 also comprises a front cross member 64 interconnecting the two frame members 60. Thus, the front cross member 64 is located forwardly of the rear cross member 62 as seen in the normal driving direction of the vehicle (i.e. when not driving in reverse). The front cross member 64 is provided with resilient elements 66, herein illustrated as a pair of bushings, of the type normally used for suspending an internal combustion engine. Similarly, near the rear cross member 62, there are resilient elements 68 provided at the two frame members 60, here illustrated as provided on a centrally facing side of the respective frame member 60. Theses rear resilient elements 68 are located slightly forwardly of the rear cross member 62.

It should be noted that the number and type of resilient elements 66, 68, as well as their placements may be different in other exemplary embodiments. For instance, the resilient elements 66 at the front cross member 64 may in other exemplary embodiments instead be provided on the two frame members 60, similarly to the rearwardly located resilient elements 68. In other exemplary embodiments, the front cross member 64 may instead of carrying two resilient element 66, only have one centrally located resilient element. Many other alternations are of course conceivable. Suitably, the total number of said resilient elements 66, 68 (i.e. including both the front and the rear resilient elements) is at least three.

Regardless of the type, number and location of the resilient elements, according to the present inventive concept, the collision protection structure 20 should be suspended from the chassis 10 by said resilient elements 66, 68 so as to act as a mass damper under normal operating conditions. Thus, it is configured to counteract or reduce the amplitude of mechanical vibrations, thereby promoting driver comfort. Accordingly, the collision protection structure 20 is enabled to move relative to the resilient elements 66, 68 to which it is connected.

Furthermore, the collision protection structure 20 should be located between the two frame members 60 and be configured to absorb energy by becoming deformed when the chassis 10 is subjected to a rearwardly directed impact force which is greater than a threshold force. The selected threshold force should, of course, be dependent on various factors, such as dimensions, strengths, structural features of the vehicle, etc. The collision protection structure 20 and its strength and deformation characteristics should therefore be dimensioned accordingly, based on the properties of the vehicle for which it is intended to be used.

The collision protection structure 20 may suitably comprise at least one rear connection element 22 at a rear end area of the collision protection structure for connecting to at least one of said resilient elements 68. In the illustrated exemplary embodiment, there may be two rear connection elements 22, one for each rear resilient element 68 located on a respective one of the two frame members 60. Similarly, the collision protection structure 20 may suitably comprise at least one front connection element 24 at a front end area of the collision protection structure 20 for connecting to at least another one of said resilient elements 66. In the illustrated exemplary embodiments, the collision protection structure 20 has two front connection elements 24, one for each front resilient element 66 provided on the front cross member 64.

As illustrated in FIG. 2, the collision protection structure 20 may be located between the front cross member 64 and the rear cross member 62. The rear cross member 62 is located rearwardly of the collision protection structure 20, and will (as explained later) when the chassis 10 is subjected to a rearwardly directed impact force which is greater than said threshold force, act as an abutment and will counteract or retard a rearward movement of the collision protection structure 20. The front cross member 64 is located forwardly of the collision protection structure 20, and will (as explained later) when the chassis 10 is subjected to said impact force, press the collision protection structure 20 rearwardly. Thus, the collision protection structure 20 may become squeezed between front cross member 64 and the rear cross member 62, wherein as the collision protection structure 20 deforms between the front cross member 64 and rear cross member 62 it will absorb at least some of the energy from the impact.

Thus, according to at least one exemplary embodiment the collision protection structure 20 is configured to be deformed between the front cross member 64 and the rear cross member 62, when the chassis 10 is subjected to said rearwardly directed impact force which is greater than a threshold force.

According to at least one exemplary embodiment when the two frame members 60 of the chassis 10 deform in reaction to a collision of the vehicle, the collision protection structure 20 is configured to limit and/or counteract further deformation of the two frame members 60. Thus, the collision protection structure 20 may function as a strengthening structure to which the frame members 60 are connected, wherein the collision protection structure 20 may brace against the front cross member 64 and rear cross member 62 counteracting further rearward movement of the front cross member 64, thereby limiting and/or counteracting further deformation of the connected two frame members 60.

The collision protection structure 20 may comprise a subframe suspended between the two frame members 60. The subframe is here illustrated as having the form of an open cage, having a lower cage side and two lateral cage sides. The cage is open from above, enabling components/sub-modules to be lowered into the cage shape. The lateral cage sides may be formed by two longitudinal subframe portions 26 extending generally in the longitudinal direction of the vehicle and located on a respective side of a central vertical plane containing the longitudinal geometrical centre axis x of the vehicle. When the chassis 10 is subjected to the impact force greater than the threshold force, then each one the longitudinal subframe portions 26 is configured to split up the energy reaching the longitudinal subframe portion 26 along at least two longitudinal load paths formed by two sections 26*a*, 26*b* of the longitudinal subframe portion 26. The two sections 26*a*, 26*b* of one of the longitudinal subframe portion 26 can be seen more clearly in the side view in FIG. 3.

Figure 3:
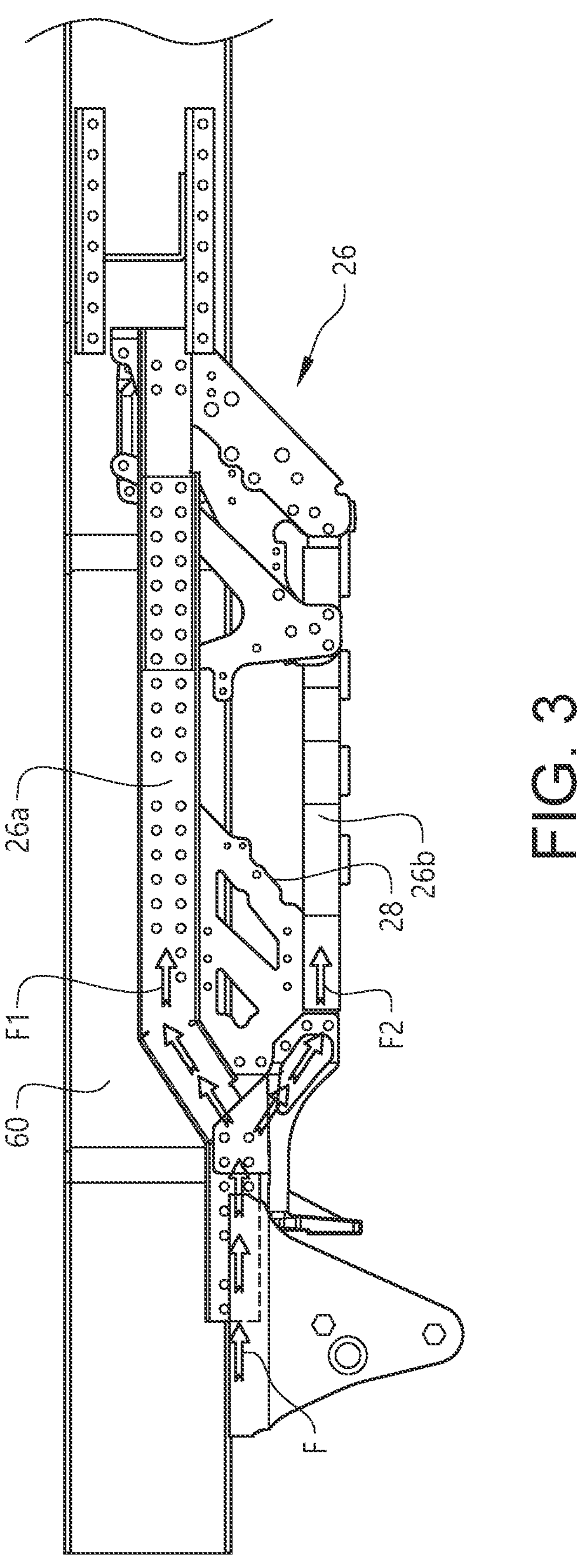
FIG. 3 is a side view of a part of the collision protection structure.

FIG. 3 is a side view of a part of the collision protection structure. As can be seen, the lateral cage side is formed by a generally longitudinal subframe portion 26, which in turn comprise two sections 26*a*, 26*b* for splitting the energy along two longitudinal load paths. The two sections 26*a*, 26*b* that form the longitudinal load paths are vertically separated, thus forming an upper section 26*a* and a lower section 26*b*. An incoming force F is thus illustrated as being split into a force F1 along the upper section 26*a* and a force F2 along the lower section 26*b*. Reinforcement sections 28 may extend between the upper section 26*a* and the lower section 26*b*.

Turning back to FIG. 2, as can be seen, the subframe may comprise one or more cross beams 30 interconnecting the longitudinal subframe portions 26 with each other. At least some of the cross beams 30 may form a bottom or lower side of the previously discussed cage-like structure. The cross beams 30 provide a shortened unsupported length of the longitudinal subframe portions 26. Thus, one or more of said cross beams 30 support, for each longitudinal subframe portion 26, at least one of the two sections 26*a*, 26*b* forming the longitudinal load paths. In accordance with the illustrated exemplary embodiment, the majority or all of the cross beams 30 may support the lower section 26*b*. However, in other exemplary embodiments, one or more of the cross beams 30 may, for instance, support the upper section 26*a*.

In the illustrated exemplary embodiment, the collision protection structure 20 is configured to form a platform or support for carrying at least one vehicle submodule, such as battery components, cooling pumps, steering pump, climate module and air compressor. The platform or support may thus be formed by the lower or bottom side of the cage, i.e. in the illustrated example by at least some of the cross beams 30. The lower section 26*b* of the load forming paths, may also form part of such a platform or support. The cage shape will also function as a protecting structure for the submodules contained therein, in addition to the benefit of making use of the available space underneath the cab.

In the presently illustrated exemplary embodiment, for each longitudinal subframe portion 26, the sections 26*a*, 26*b* forming the longitudinal load paths are less stiff relative to at least one of a forwardly and a rearwardly adjacent section of the subframe portion 26. However, in other exemplary embodiments, it may be the other way around, i.e. that the two sections 26*a*, 26*b* are stiffer relative to the forwardly and/or rearwardly adjacent sections of the subframe portions 26.

FIG. 4 is a top view of the collision protection structure 20. In FIG. 4 it can be clearly seen that the collision protection structure 20 is suspended between the two frame members 60 of the chassis.

In particular, the collision protection structure 20 is suspended from the two front resilient elements 66 provided on the front cross bar 64, which extends between the two frame members 60, and from two rear resilient elements 68 provided at a respective one of the two frame members 60.

Suitably, apart from the connection to the resilient elements 66, 68, there is no other contact between the chassis 10 and the collision protection structure 20, in normal use. In particular, it may be noted that there is a gap between front cross member 64 and the forward-most cross beam 32 of the collision protection structure 20. The forward-most cross beam 32 of the collision protection structure 20 is thus located rearwardly of and spaced from the front cross member 64 of the chassis 10. The forward-most cross beam 32 functions as an impact receiving area, as will be explained in more detail later. However, it should be noted that other configurations of the impact receiving area may be conceivable, and may thus not necessarily be represented by a cross beam. The rear end 34 of the collision protections structure 20 will function as an impact conveying area. Again, it should be understood that the configuration, design, shape, etc. for such an impact conveying area may be different in different embodiments. Suitably, the rear end 34 or impact conveying area is located forwardly of and spaced from the rear cross member 62 of the chassis 10.

Figure 5:
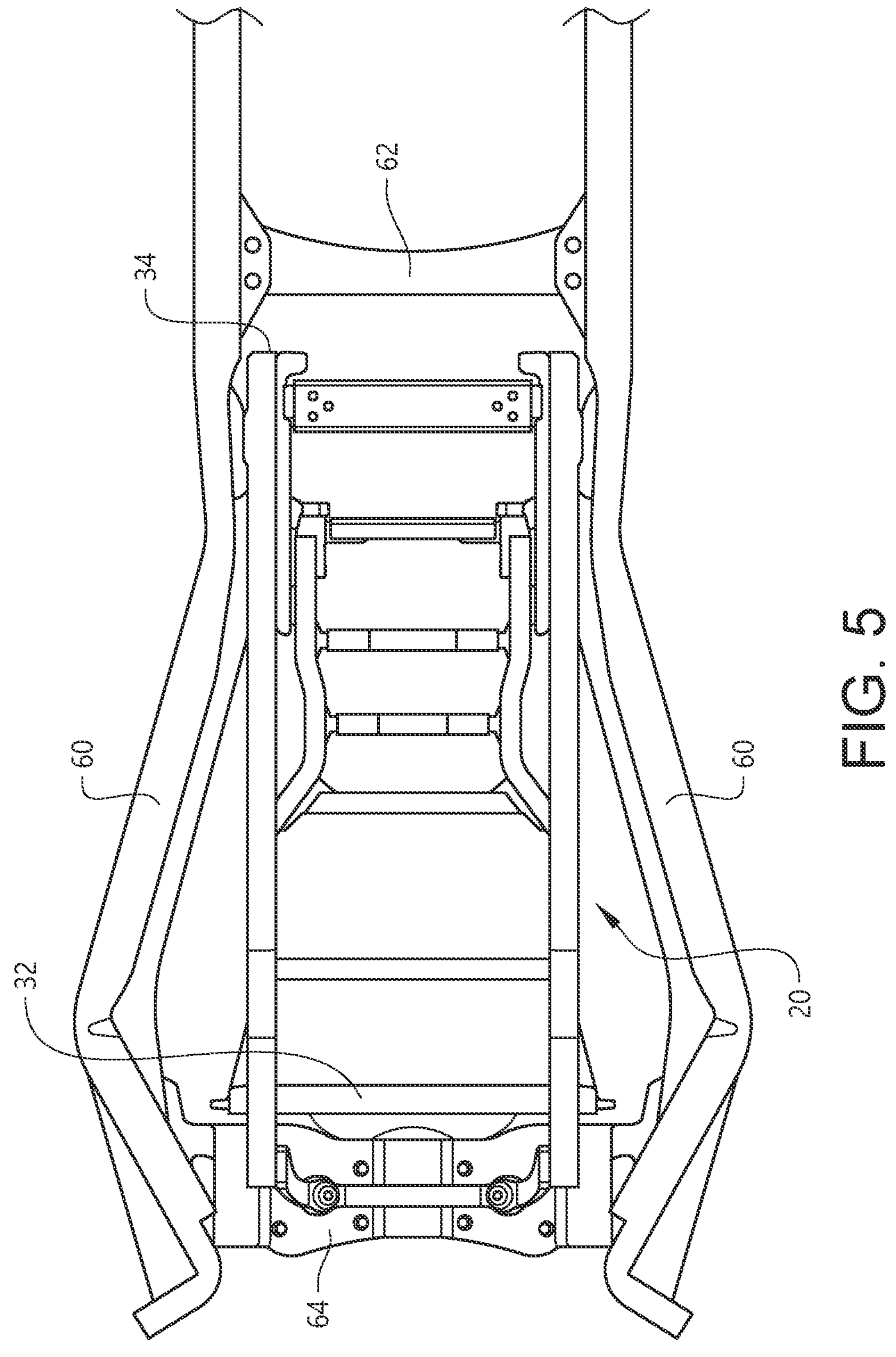
FIGS. 5-7 illustrate a deformation sequence of the collision protection structure upon a frontal collision of the vehicle.
Figure 6:
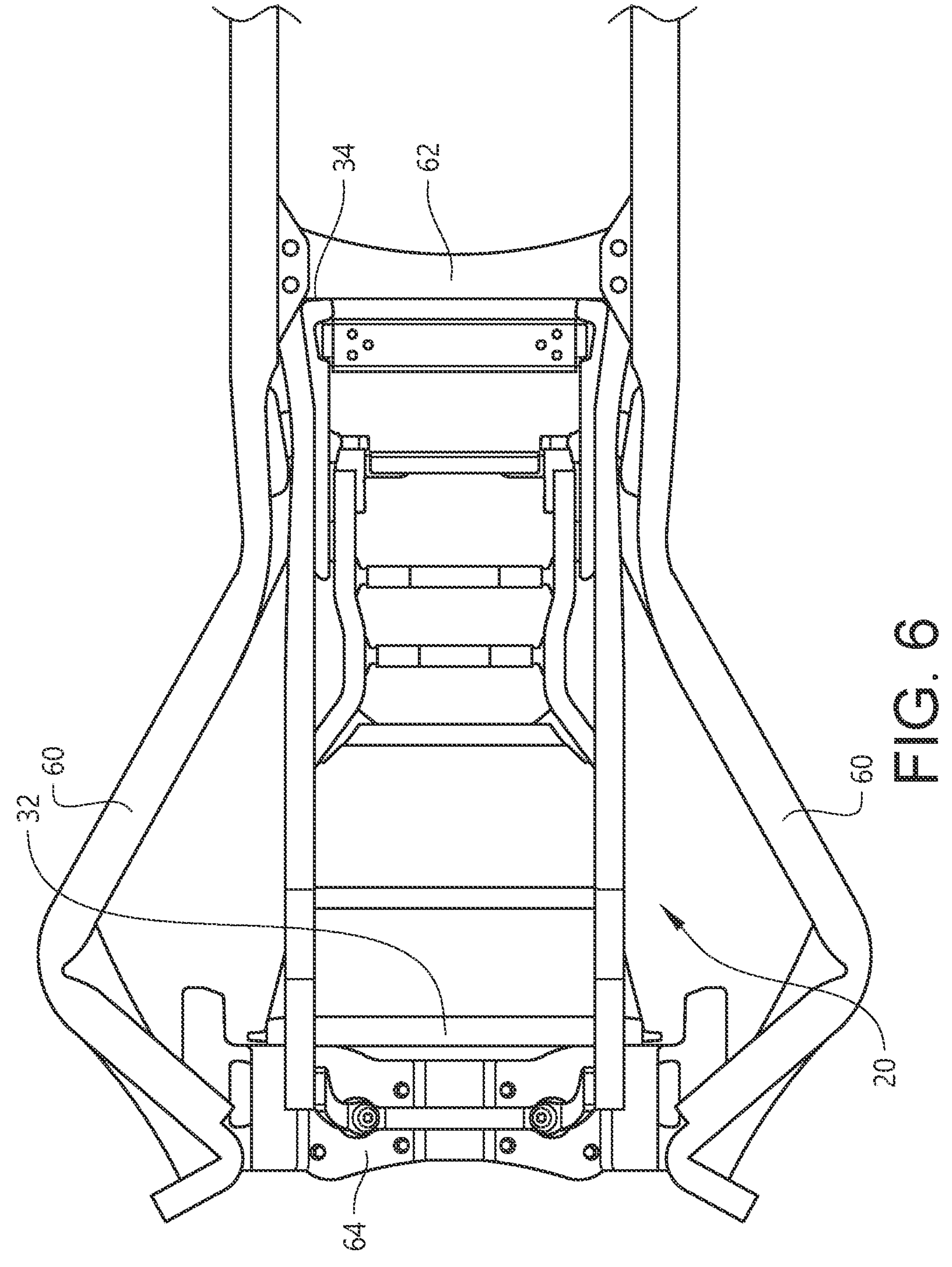
Figure 7:
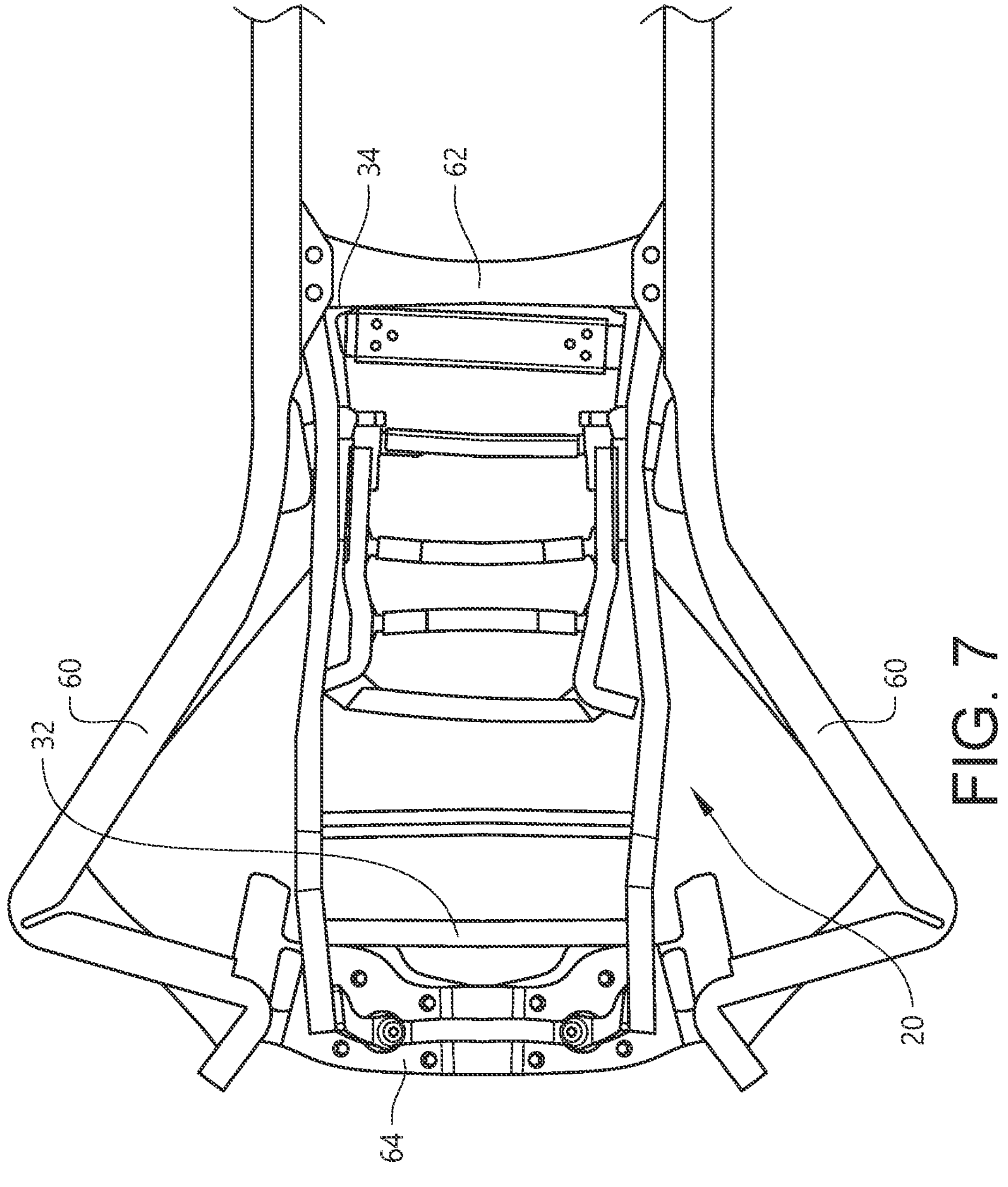

Turning now to the sequence illustrated in FIGS. 5-7, these figures illustrate a deformation sequence of the collision protection structure 20 upon a frontal collision of the vehicle.

Upon a frontal collision which generates an impact load above a threshold value, the following will occur.

Initially, as illustrated in FIG. 5, the two frame members 60 of the chassis will start buckling. As a consequence thereof the front cross member 64 will be forced to move rearwardly and will come into contact with the impact receiving area of the collision protection structure 20, which in this example is represented by the forward-most cross beam 32. As the buckling of the frame members 60 progresses, the front cross member 64 will push the collision protection structure 20 rearwardly so that the rear end 34 or impact conveying area of the collision protection structure 20 comes into contact with the rear cross member 62. This is illustrated in FIG. 6. At least some of the impact energy will then be absorbed by the collision protection structure 20 as it is pressed between the front cross member 64 and the rear cross member 62. This is illustrated in FIG. 7, which shows collision protection structure 20 in a deformed state. Because the collision protection structure 20 is braced against the front cross member 64 and the rear cross member 62, the progress of the buckling of the frame members 60 is at least partly counteracted or limited.

It is to be understood that the present invention is not limited to the embodiments described above and illustrated in the drawings; rather, the skilled person will recognize that many changes and modifications may be made within the scope of the appended claims.

The invention claimed is:

1. A vehicle, comprising:

a rear end;

a front end located forwardly of the rear end, wherein a direction extending from the rear end towards the front end or vice versa is defined as a longitudinal direction of the vehicle;

a chassis extending between the rear end and the front end, the chassis comprising two frame members having their main directions of extension along the longitudinal direction and being located on a respective side of a longitudinal geometrical centre axis of the chassis;

resilient elements provided on the chassis; and a collision protection structure located between the two frame members and configured to absorb energy by becoming deformed when the chassis is subjected to a rearwardly directed impact force which is greater than a threshold force, wherein the collision protection structure is suspended from the chassis by the resilient elements so as to act as a mass damper under normal operating conditions;

wherein the chassis comprises a front cross member located forwardly of the collision protection structure and interconnecting the two frame members of the chassis, wherein when the chassis is subjected to the rearwardly directed impact force which is greater than the threshold force, then the front cross member is configured to press the collision protection structure rearwardly.

2. The vehicle of claim 1, comprising a cab, wherein the collision protection structure is located underneath the cab.

3. The vehicle of claim 1, wherein the collision protection structure is configured to be deformed between the front cross member and a rear cross member when the chassis is subjected to the rearwardly directed impact force which is greater than the threshold force.

4. The vehicle of claim 1, wherein, when the two frame members of the chassis deform in reaction to a collision of the vehicle, the collision protection structure is configured to limit and/or counteract further deformation of the two frame members.

5. The vehicle of claim 1, wherein the collision protection structure comprises a subframe suspended between the two frame members of the chassis.

6. The vehicle of claim 1, wherein the subframe comprises two longitudinal subframe portions extending generally in the longitudinal direction of the vehicle and being located on a respective side of a central vertical plane containing the longitudinal geometrical centre axis, wherein when the chassis is subjected to the rearwardly directed impact force which is greater than the threshold force, then each one of the longitudinal subframe portions is configured to split up the energy reaching the longitudinal subframe portion as a result of the impact force, along at least two longitudinal load paths formed by two sections of the longitudinal subframe portion.

7. The vehicle of claim 6, wherein the subframe comprises one or more cross beams interconnecting the longitudinal subframe portions with each other, thereby providing a shortened unsupported length of the longitudinal subframe portions, wherein the one or more cross beams support, for each longitudinal subframe portion, at least one of the sections forming the longitudinal load paths.

8. The vehicle of claim 6, wherein for each longitudinal subframe portion, the sections forming the longitudinal load paths are less stiff relative to at least one of a forwardly and a rearwardly adjacent section of the subframe portion.

9. The vehicle of claim 6, wherein for each longitudinal subframe portion, the two sections that form the longitudinal load paths are vertically separated, forming an upper section and a lower section.

10. The vehicle of claim 1, wherein the number of the resilient elements is at least three, wherein the collision protection structure comprises at least one rear connection element at a rear end area of the collision protection structure for connecting to at least one of the resilient elements, and at least one front connection element at a front end area of the collision protection structure for connecting to at least another one of the resilient elements.

11. The vehicle of claim 10, wherein each one of the two frame members of the chassis carries at least one of the resilient elements.

12. The vehicle of claim 1, wherein the collision protection structure is configured to form a platform or support for carrying at least one vehicle sub-module.

* * * * *